(12) United States Patent
Jeon et al.

(10) Patent No.: US 8,116,393 B2
(45) Date of Patent: Feb. 14, 2012

(54) METHOD AND APPARATUS FOR ESTIMATING CHANNEL STATE INFORMATION

(75) Inventors: Hyun Bae Jeon, Seoul (KR); Sergey Zhidkov, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1050 days.

(21) Appl. No.: 12/017,924

(22) Filed: Jan. 22, 2008

(65) Prior Publication Data

US 2008/0175330 A1    Jul. 24, 2008

(30) Foreign Application Priority Data

Jan. 24, 2007   (KR) ........................ 10-2007-0007399

(51) Int. Cl.
*H04L 27/28* (2006.01)
(52) U.S. Cl. ....................................................... 375/260
(58) Field of Classification Search .................. 375/259, 375/260, 316, 346
See application file for complete search history.

(56) References Cited

U.S. PATENT DOCUMENTS

| | | | | |
|---|---|---|---|---|
| 6,744,828 B1 * | 6/2004 | Uchiyama et al. | ............ | 375/326 |
| 2003/0026295 A1 * | 2/2003 | Baum et al. | .................. | 370/503 |
| 2007/0270100 A1 * | 11/2007 | Agrawal et al. | ............ | 455/67.11 |

FOREIGN PATENT DOCUMENTS

| | | |
|---|---|---|
| KR | 1020040110340 | 12/2004 |
| KR | 1020060077800 | 7/2006 |
| KR | 1020060092400 | 8/2006 |
| WO | WO02/49305 | 6/2002 |

* cited by examiner

*Primary Examiner* — Kevin M Burd
(74) *Attorney, Agent, or Firm* — F. Chau & Associates, LLC

(57) ABSTRACT

An orthogonal frequency division multiplexing (OFDM) receiver includes a n average power calculation unit and an output unit. The average power calculation unit calculates and outputs a first average power of a null symbol section of each transmitted frame output from an OFDM transmitter and calculates and outputs second average powers of sub-carriers that correspond to each null symbol section. The output unit compares the first average power and the second average powers, to perform a reciprocal transformation on difference values of the first average power and each of the second average powers based on results of the comparisons, and to store and output reciprocally transformed values as channel state information.

20 Claims, 3 Drawing Sheets

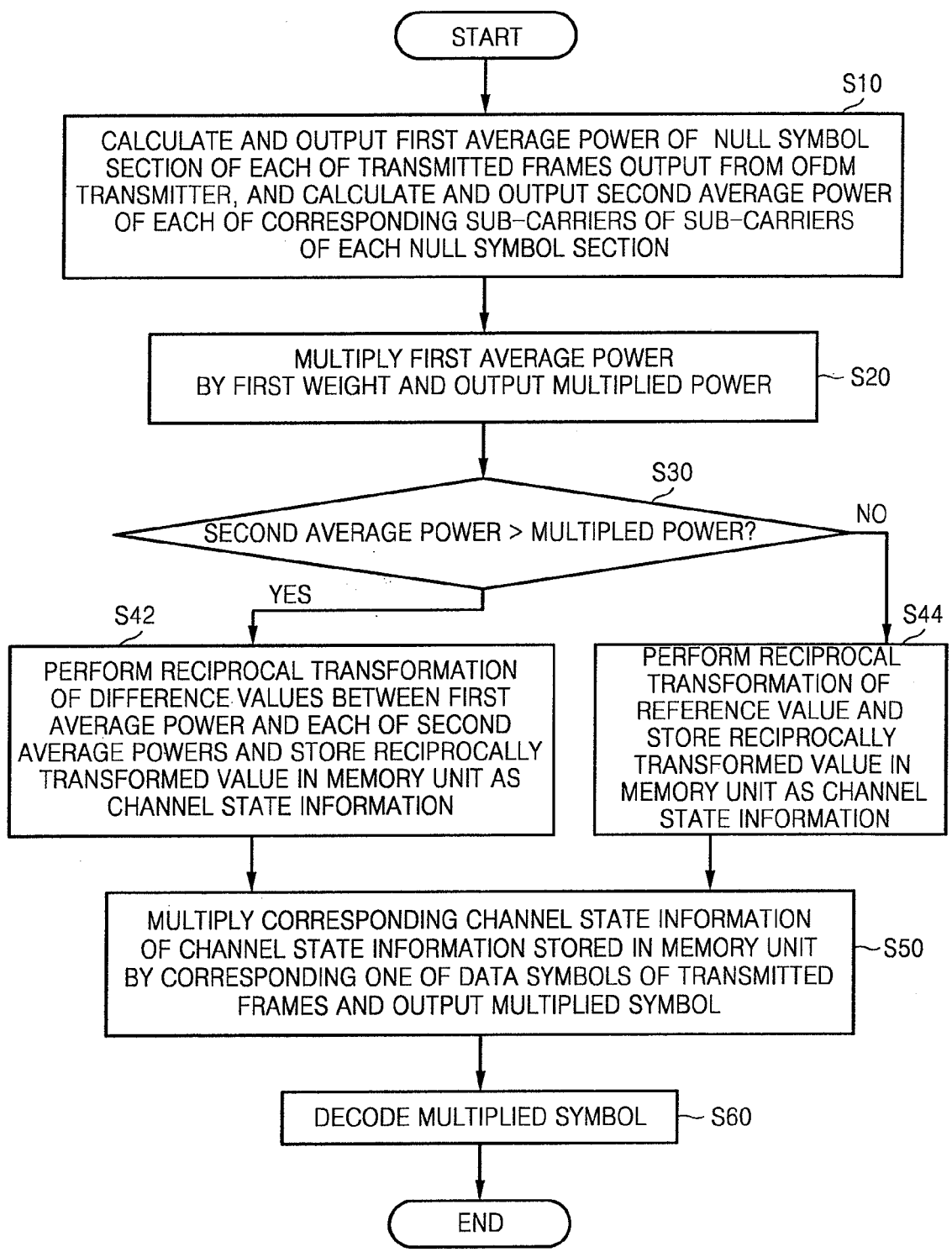

METHOD AND APPARATUS FOR ESTIMATING CHANNEL STATE INFORMATION

CROSS-REFERENCE TO RELATED PATENT APPLICATION

This application claims priority under 35 U.S.C. §119 from Korean Patent Application No. 10-2007-0007399, filed on Jan. 24, 2007, the disclosure of which is herein incorporated by reference in its entirety.

BACKGROUND OF THE INVENTION

1. Technical Field

The present disclosure relates to an orthogonal frequency division multiplexing (OFDM) receiver, and more particularly, to a method and apparatus for estimating channel state information to detect noise and an interference signal included in frames transmitted by an OFDM transmitter, and a receiver having the apparatus.

2. Discussion of Related Art

An orthogonal frequency division multiplexing method (hereinafter, referred to as "OFDM") is a wide band modulation method for dividing a frequency band width assigned for a communication session into a plurality of narrow band frequency sub-bands. Each of the narrow band frequency sub-bands includes a radio frequency (RF) sub-carrier. Each sub-carrier is mathematically orthogonal to the RF sub-carrier included in each of the other sub-channels.

The OFDM method is a multi-carrier modulation method in which data to be transmitted is primarily converted to a complex symbol in the form of M-ary QAM (quadrature amplitude modulation). A complex symbol sequence or a series of complex symbols is converted to a plurality of parallel complex symbols through a serial-to-parallel conversion. Each of the parallel complex symbols is rectangular pulse-shaped and sub-carrier modulated.

In the multi-carrier modulation method, the frequency interval between the sub-carrier is set such that all sub-carrier modulated parallel complex symbols are orthogonal. Thus, in the OFDM method, spectrums of the sub-carriers are overlapped with one another without interruption by other carriers due to the orthogonality of the sub-carriers. Since the frequency bandwidth is divided into a plurality of orthogonal sub-bands, a high data transfer speed and an efficient use of a bandwidth may be possible.

Each of the sub-carriers used in the OFDM method may have independent channel information. Thus, each sub-carrier may have a different signal to noise (S/N) ratio according to a fading property of the channel. For example, sub-carriers in a multi-path channel may have different S/N ratios, since the data loss of a sub-carrier having a null section is greater than that of a sub-carrier without the null section. A null section may be caused by white noise.

In addition, data of each sub-carrier can be distorted when a frequency selective interference signal is input to a co-channel. Examples of frequency selective interference signals include a national television system committee (NTSC) signal, a phase alternation by line (PAL) signal, or an FM modulated signal. Examples of co-channels include an ultra high frequency (UHF) channel or a very high frequency (VHF) channel.

A proposed method reduces co-channel interference to reduce the distortion of data. A degree of noise due to fading or interference by an interference signal is measured, the measured values are output as channel state information (CSI), and information of the sub-carrier is decoded based on the CSI. Signal power and noise power are calculated after the channel response is estimated using pilot information of a sub-carrier output from an equalizer. However, the structure of the equalizer may be complex and transmission performance may deteriorate due to input noise of a receiving end. In addition, it may be difficult to apply the method to a communication system that does not include the pilot information or the equalizer, for example, digital audio broadcasting (DAB) or terrestrial-digital multimedia broadcasting (T-DMB).

Thus, there is a need for a method and apparatus for estimating channel state information which can detect noise and an interference signal included in transmitted frames based on the average powers of null symbols of the transmitted frames output from an OFDM transmitter.

SUMMARY OF THE INVENTION

According to an exemplary embodiment of the present invention, a method of estimating channel state information includes calculating and outputting a first average power of a null symbol section of each transmitted frame output from an orthogonal frequency division multiplexing (OFDM) transmitter and calculating and outputting second average powers of sub-carriers that correspond to each null symbol section, and comparing the first average power and each of the second average powers and for each comparison, performing a reciprocal transformation on one of a difference between the second average power and the first average power to generate a reciprocally transformed value when the second average power is larger than the first average power and a reference value to generate the reciprocally transformed value when the second average power is less than the first average power, and storing the reciprocally transformed value as channel state information.

The comparing of the first average power and each of the second average powers may include multiplying the first average power by a first weight to generate a multiplied power and comparing the multiplied power with each of the second average powers.

The performing of the reciprocal transformation on a difference between the second average power and the first average power to generate a reciprocally transformed value when the second average power is larger than the first average power may include multiplying the difference by a second weight to generate a multiplied power, and performing the reciprocal transformation on the multiplied power to generate the reciprocally transformed value.

The method may further include multiplying the stored channel state information of the channel state information by a data symbol of the corresponding transmitted frames to generate multiplied symbols and outputting the multiplied symbols. The method may further include decoding each of the multiplied symbols.

According to an exemplary embodiment of the present invention, an orthogonal frequency division multiplexing (OFDM) receiver includes an average power calculation unit and an output unit. The average power calculation unit calculates and outputs a first average power of a null symbol section of each transmitted frame output from an OFDM transmitter and calculates and outputs second average powers of sub-carriers that correspond to each null symbol section. The output unit compares the first average power and each of the second average powers, to perform a reciprocal transformation on difference values of the first average power and each of the second average powers based on results of the comparisons, and to store and output reciprocally transformed values as channel state information.

The average power calculation unit may include a first average power calculator and a second average power calculator. The first average power calculator calculates and outputs the first average power of the null symbol section of each transmitted frame output from the OFDM transmitter. The second average power calculator calculates and outputs the second average powers of sub-carriers that correspond to each null symbol section.

The OFDM transmitter may further include a first selection unit and a second selection unit. The first selection unit can select the null symbol section of each transmitted frame output from the OFDM transmitter. The second selection unit can transmit an output signal of the first selection unit to the average power calculation unit in response to an identification information signal of the OFDM transmitter.

The output unit may further include a first amplifier, a deinterleaver, a comparison unit, a second amplifier, a reciprocal transformer, and a memory unit. The first amplifier amplifies the first average power by a first weight. The deinterleaver deinterleaves each of the second average powers. The comparison unit compares output values of the deinterleaver with an output value of the first amplifier and output first comparison results. The second amplifier amplifies each of the first comparison results output from the comparison unit by a second weight. The reciprocal transformer performs a reciprocal transformation on output values of the second amplifier and outputs each of the reciprocally transformed values as the channel state information. The memory unit can store the channel state information output from the reciprocal transformer.

The comparison unit can include a subtractor, a comparator, and a selection unit. The subtractor subtracts an output value of the first amplifier from each of the output values of the deinterleaver. The comparator compares the output values of the subtractor with a reference value and outputs second comparison results. The selection unit outputs the output values of the subtractor when the comparison result of the comparator is greater than the reference value, and outputs the reference value when the comparison result is less than the reference value. The reciprocal transformer performs reciprocal transformation on the output values of the subtractor or the reference values and outputs reciprocally transformed values as the channel state information.

The OFDM transmitter may further include a multiplier and a decoder. The multiplier multiplies the channel state information stored in the outputting unit by a data symbol of the corresponding transmitted frames and outputs multiplied symbols. The decoder decodes each of the multiplied symbols output from the multiplier.

According to an exemplary embodiment of the present invention, a method of estimating channel state information includes decoding, differentially, corresponding symbols in a symbol section of each transmitted frame output from an OFDM transmitter to generate differentially decoded symbols and deinterleaving each of the differentially decoded symbols, using a decoding unit, comparing average powers with a reference value based on average powers of a null symbol section for each of the transmitted frames and outputting a result of the comparison as channel state information, using a channel state information estimation unit, and multiplying an output value of the decoding unit by an output value of the channel state information estimation unit, using a multiplier.

The outputting of the result of the comparison as the channel state information may include calculating and outputting a first average power of a null symbol section of each transmitted frame and calculating and outputting a second average power of sub-carriers that correspond to each null symbol section, and comparing the first average power with each of the second average powers, performing reciprocal transformation on difference values between the first average power and each of the second average powers based on results of the comparison, and storing and outputting reciprocally transformed values as the channel state information.

According to an exemplary embodiment of the present invention, an orthogonal frequency division multiplexing (OFDM) receiver includes a decoding unit, a channel state information estimation unit, and a multiplier. The decoding unit differentially decodes corresponding symbols in a symbol section of transmitted frames output from an OFDM transmitter and to deinterleave each of the differentially decoded symbols. The channel state information estimation unit compares average powers with a reference value based on average powers of a null symbol section of each of the transmitted frames and outputs a result of the comparison as channel state information, The multiplier multiplies an output value of the decoding unit by a corresponding output value of the channel state information estimation unit.

The channel state information estimation unit may include an average power calculation unit and an output unit. The average power calculation unit calculates and outputs a first average power of a null symbol section of each of the transmitted frames and calculates and outputs a second average power for sub-carriers that correspond to each null symbol section. The output unit compares the first average power with each of the second average powers, performs a reciprocal transformation on difference values between the first average power and each of the second average powers based on results of the comparison, and stores and outputs reciprocally transformed values as the channel state information.

According to an exemplary embodiment of the present invention, a noise reduction unit includes an average power calculation unit, a de-interleaver, an amplifier, a reference signal, a noise estimation unit, and a reduction unit. The average power calculation unit receives a plurality of orthogonal frequency division multiplexing (OFDM) frames and calculates a first average power of null symbol sections of the frames and a second average power of subcarriers of the null symbol sections. The de-interleaver de-interleaves the second average power to generate a de-interleaved signal. The amplifier amplifies the first average power to generate an amplified power signal. The noise estimation unit generates noise information based on the de-interleaved signal, the amplified power signal. The reduction unit reduces noise in the OFDM frames using the noise information.

According to an exemplary embodiment of the present invention, a noise estimation unit comprises a de-interleaver, an amplifier, and a recipocal transformer. The de-interleaver de-interleaves a first signal that includes an average power of subcarriers of null symbol sections of a plurality of orthogonal frequency division multiplexing (OFDM) frames. The amplifier amplifies a second signal that includes an average power of null symbol sections of the frames to generate an amplified power signal. The recipocal transformer performs one of a reciprocal transformation on a difference between the de-interleaved signal and the amplified signal and a reciprocal transformation of a reference signal to generate a noise estimation.

BRIEF DESCRIPTION OF THE DRAWINGS

The present invention will become more apparent by describing in detail exemplary embodiments thereof with reference to the attached drawings in which:

FIG. 3 is a flow chart for a method of estimating channel state information according to an exemplary embodiment of the present invention.

DETAILED DESCRIPTION OF EXEMPLARY EMBODIMENTS

Figure 1:
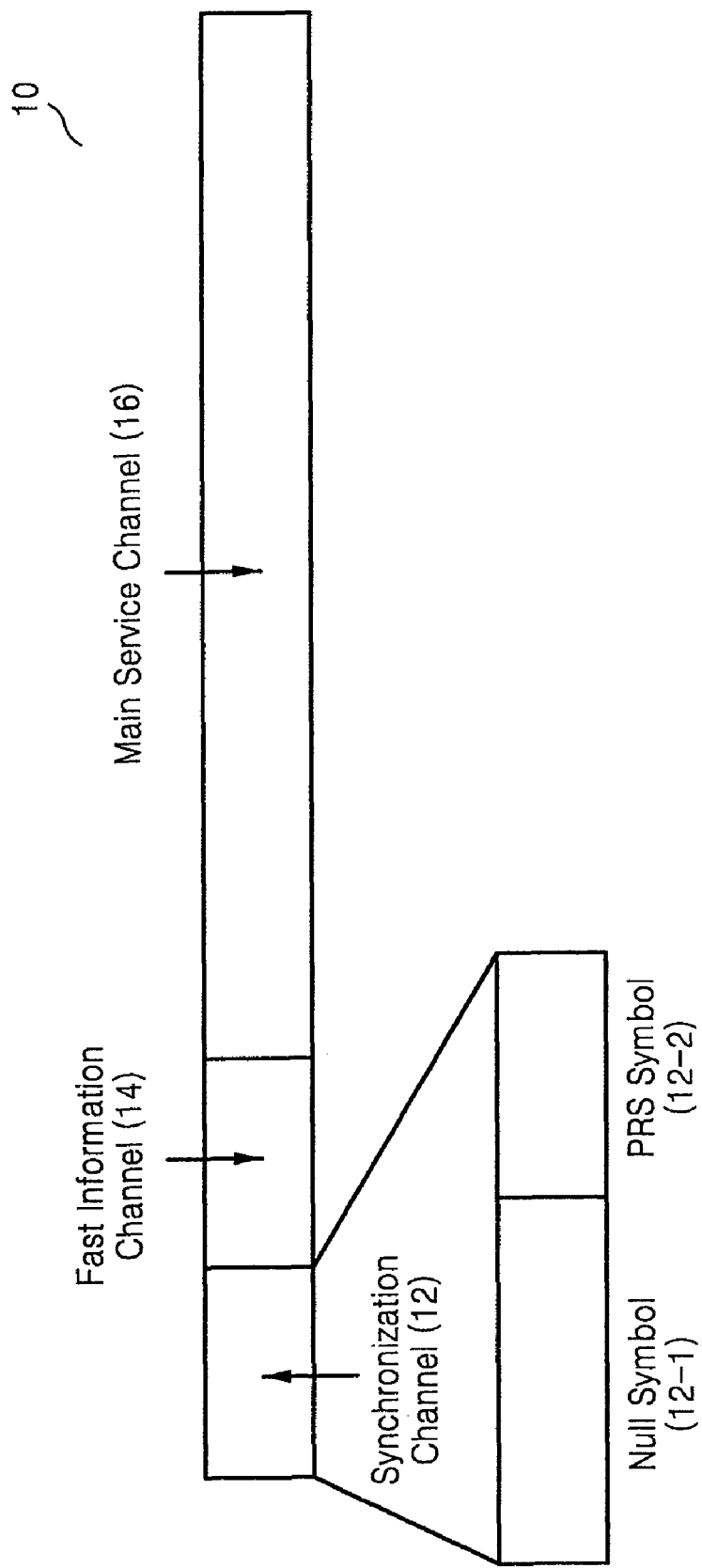
FIG. 1 illustrates an OFDM transmitted frame according to an exemplary embodiment of the present invention.

Hereinafter, the present invention will be described in detail by explaining exemplary embodiments of the invention with reference to the attached drawings. Like reference numerals in the drawings denote like elements.

FIG. 1 illustrates an orthogonal frequency division multiplexing (OFDM) transmitted frame according to an exemplary embodiment of the present invention. Referring to FIG. 1, an OFDM transmitted frame 10 includes symbols having a plurality of sub-carriers. The OFDM transmitted frame 10 may be transmitted using a fast Fourier transform. The OFDM transmitted frame 10 can be transmitted from a transmitting end of a system such as, for example, a digital audio broadcasting (DAB) system or a terrestrial-digital multimedia broadcasting (T-DMB) system.

The OFDM transmitted frame 10 includes a synchronization channel 12, a fast information channel 14, and a service channel 16. The synchronization channel 12 includes a null symbol section 12-1 and a phase reference symbol (PRS) section 12-2.

The null symbol 12-1 provides a transmitted frame synchronization to determine a start position of the OFDM transmitted frame 10 and transmitter identification information (TII) output from an OFDM transmitter (not shown). The PRS section 12-2 provides a reference symbol for OFDM symbol synchronization and sub-carrier frequency synchronization, and information for carrier recovery (CR) or symbol time recovery (STR).

Figure 2:
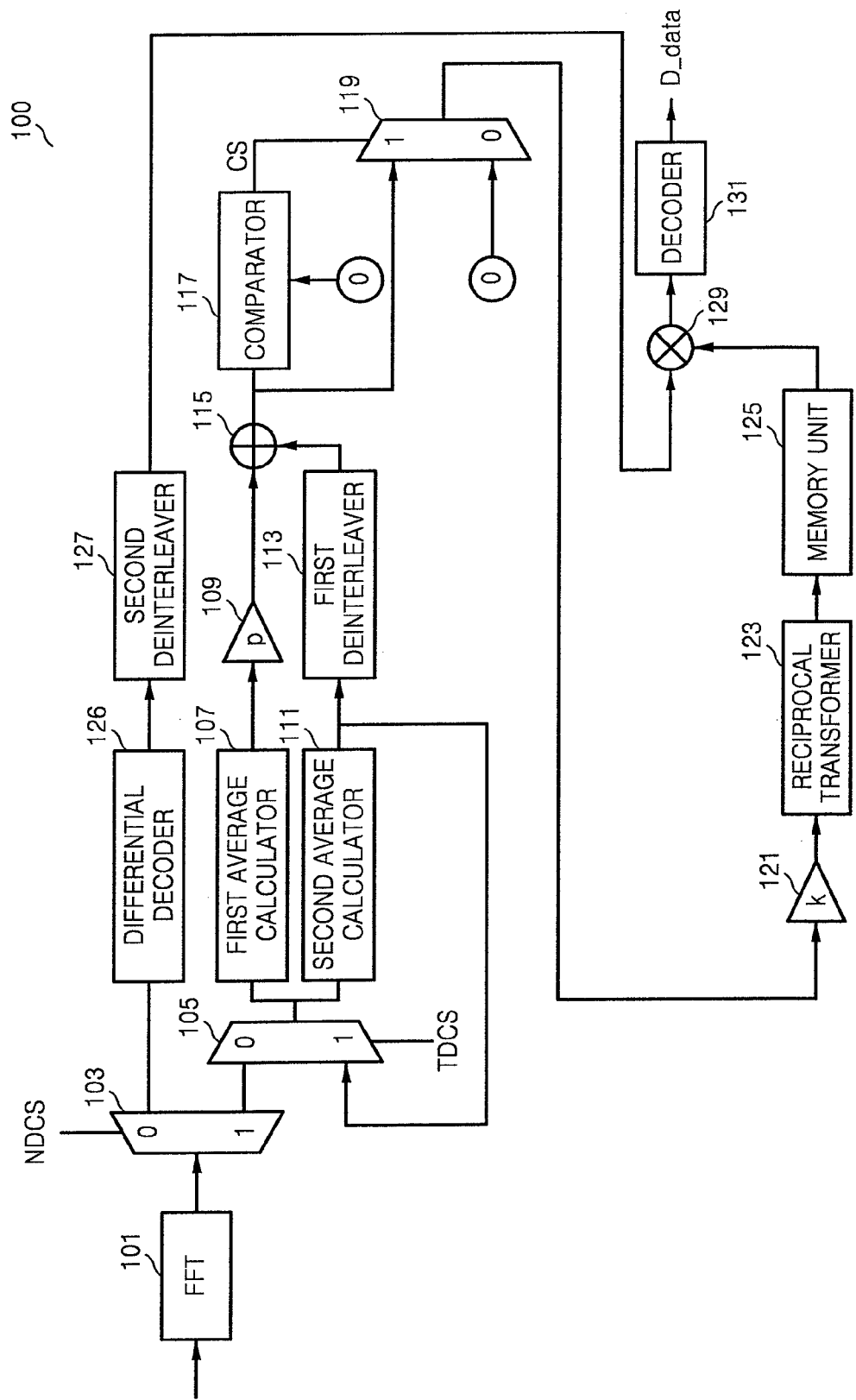
FIG. 2 is a block diagram of an OFDM receiver according to an exemplary embodiment of the present invention.

The fast information channel 14 provides information needed when an OFDM receiver 100 of FIG. 2 processes data. For example, the fast information channel 14 provides multiplex configuration information (MCI) containing information on the structure of a sub-channel, service information (SI), or information for fast information data channel (FIDC) service. The service channel 16 transmits data content or data symbols provided by the OFDM transmitter.

FIG. 2 is a block diagram of an OFDM receiver according to an exemplary embodiment of the present invention. Referring to FIGS. 1 and 2, the OFDM receiver 100 includes a Fast Fourier transformer (FFT) unit 101, a demultiplexer (DEMUX) 103, a first selection unit 105, a channel state information estimation unit, a decoding unit, a multiplier 129, and a decoder 131. The information estimation unit includes an average power calculation unit and an output unit. The average power calculation unit includes a first average calculator 107 and a second average calculator 111. The output unit includes a first amplifier 109, a first deinterleaver 113, a comparison unit, a second amplifier 121, a reciprocal transformer 123, and a memory unit 125. The comparison unit includes a subtractor 115, a comparator 117, and a second selection unit 119.

The FFT unit 101 applies a Fast Fourier transform to a transmitted frame output from an OFDM transmitter (not shown) and outputs an OFDM transmitted frame 10 (Sk'). The OFDM transmitted frame 10 output from the FFT unit 101 can be calculated in Equation 1.

$$S'_k = S_k \times h_k + n_k \quad \text{[Equation 1]}$$

In Equation 1, k is a natural number and an index of a sub-carrier, $S_k$ is a $k^{th}$ sub-carrier generated by the OFDM transmitter, $h_k$ is a channel response at the position of the sub-carrier, and $n_k$ is a noise component, for example, white noise, at the position of the sub-carrier.

In addition, when an interference signal, for example, a co-channel interference signal $I_k$, exists, the OFDM transmitted frame 10 ($S_k'$) can be calculated in Equation 2.

$$S'_k = S_k \times h_k + n_k I_k \quad \text{[Equation 2]}$$

In Equation 2, $I_k$ is an interference signal affecting the position of the sub-carrier. Since the OFDM transmitted frame 10 includes the noise component and the interference signal, decoded data output from the decoder 131 can be distorted. The DEMUX 103, in response to a null symbol detection control signal NDCS, transmits a sub-carrier in the null symbol section 12-1 of the OFDM transmitted frame 10 to a first selection unit 105.

The NDCS, which is generated from a null symbol detection unit (not shown), is a control signal based on the null symbol section 12-1 of the OFDM transmitted frame 10. The NDCS has a first logic state, for example, a high level state of "1", when the null symbol section 12-1 is included in the OFDM transmitted frame 10 and has a second logic state, for example, a low level of "0", when the null symbol 12-1 is not included in the OFDM transmitted frame 10.

The DEMUX 103 transmits a sub-carrier in the null symbol section 12-1 included in the OFDM transmitted frame 10 to the first selection unit 105 in response to the NDCS in the first logic state, for example, a high level state of "1". In addition, the DEMUX 103 transmits a sub-carrier included in the PRS section 12-2, the fast information channel 14, and the service channel 16 of the OFDM transmitted frame 10 to a differential decoder 126 in response to the NDCS in the second logic state, for example, a low level state of "0".

The first selection unit 105, in response to a transmitter identification signal detection control signal (TDCS), transmits an output signal of the DEMUX 103 to a first average power calculator 107 and a second average power calculator 111.

The TDCS, which is generated by an identification information detection block (not shown), is a control signal generated in response to OFDM transmitter identification information (TII). When the TII is included in the null symbol section 12-1, the TDCS has the first logic state, for example, a high level state of "1". When the TII is not included in the null symbol section 12-1, the TDCS has the second logic state, for example, a low level state of "0".

The first selection unit 105 outputs an output value of the second average power calculator 111 to the first average power calculator 107 and the second average power calculator 111 in response to the TDCS in the first logic state, for example, a high level of "1". The first selection unit 105 outputs the sub-carrier in the null symbol section 12-1 to the first average power calculator 107 and the second average power calculator 111 in response to the TDCS in the second logic state, for example, a low level of "0".

Each of the null symbol sections 12-1 characteristically has a power of "0" when a transmitted frame synchronization determines a start position of the OFDM transmitted frame 10. The power of a noise component can be calculated by calculating the average power of each null symbol section 12-1. When the TII s included in the null symbol section 12-1, since the average power of the null symbol 12-1 is not "0", an error may be generated when the power of the noise and an interference signal is recognized. Thus, the null symbol section 12-1 including the TII is not included in the calculation of the average power.

When the null symbol section 12-1 does not include the TII, the DEMUX 103 can transmit the sub-carrier of the null symbol section 12-1 directly to the first and second average power calculators 107 and 111. The channel state information estimation unit having an average power calculation unit and an output unit compares each of the average powers and a reference value based on the average powers of the null symbol section 12-1 of each of the transmitted frames output from the OFDM transmitter, and outputs a result of the comparison as channel state information $CSI_k$.

The average power calculation unit having the first and second average power calculators 107 and 111 calculates and outputs a first average power of the null symbol section 12-1 of each transmitted frame output from the OFDM transmitter and calculates and outputs a second average power of each sub-carrier corresponding to the sub-carriers of each null symbol section 12-1.

The first average power calculator 107 calculates and outputs a first average power of the null symbol section 12-1 of each of the transmitted frames output from the OFDM transmitter. The second average power calculator 111 calculates and outputs a second average power of each of the corresponding sub-carriers of the null symbol section 12-1. For example, when there are 100 transmitted frames, the first average power calculator 107 calculates and outputs a first average power corresponding to an average power value of the overall null symbol section 12-1 included in each of the 100 transmitted frames.

When the number of the sub-carriers included in the null symbol section 12-1 included in each of the 100 transmitted frames is 50, the second average power calculator 111 outputs second average powers calculated for each of the $q^{th}$ sub-carriers, where q is a natural number, in each of the null symbol sections 12-1. Each of the null symbols 12-1 characteristically has a power of "0" when a transmitted frame synchronization determines the start position of the OFDM transmitted frame 10.

In Equation 2, since only the noise and interference signal are present in the signal in the null symbol section 12-1, the average power value of the noise and interference signal having a value greater than the first average power can be obtained by subtracting the first average power of the null symbol section 12-1 of each of the transmitted frames output from the OFDM transmitter from the second average power of each sub-carrier.

The first average power is a reference value of the amount of noise and interference allowed by the OFDM receiver 100 as an average power of the null symbol section of each of the transmitted frames. Each second average power can be an average power value of the noise and interference that a corresponding one of the sub-carriers of each of the transmitted frames has.

The noise and interference signal affect the corresponding sub-carrier greater than the reference value for each sub-carrier. For example, in the sub-carriers of each of the transmitted frames, when the second average power of the first sub-carrier is greater than the first average power, the possibility of distortion of data of the service channel 16 due to the noise and interference signal may increase. In the sub-carriers of each of the transmitted frames, when the second average power of the second sub-carrier is greater than the first average power, the possibility of distortion of data of the service channel 16 due to the noise and interference signal may decrease.

The output unit compares the first average power with each of the second average powers, performs a reciprocal transformation on difference values between the first average power and each of the second average powers based on a result of the comparison, and stores and outputs reciprocally transformed values as the channel state information $CSI_k$.

The first amplifier 109 amplifies the first average power by a first weight p. As the first amplifier 109 amplifies the first average power by the first weight p, a noise level that is used as a reference when the average power of the noise and interference signal is calculated can be adjusted.

The first deinterleaver 113 deinterleaves the respective second average powers output from the second average power calculator 111. The comparison unit, including the subtractor 115, the comparator 117, and the second selection unit 119, compares the output value of the first amplifier 109 with output values of the first deinterleaver 113 and outputs first comparison results.

The subtractor 115 subtracts the output value of the first amplifier 109 from each of the output values of the first deinterleaver 113. The subtractor 115 can be embodied by an adder. The comparator 117 compares each of the output values of the subtractor 115 with the reference value and outputs second comparison results. For example, the comparator 117 determines whether any one of the output values of the subtractor 115 is greater than the reference value, for example, "0", and outputs a comparison signal CS according to a result of the determination.

The second selection unit 119 outputs a corresponding one of the output values of the subtractor 115 based on the comparison signal CS used as a selection signal or outputs the reference value, for example, "0". For example, the second selection unit 119, in response to the comparison signal CS of the first logic state, for example, a high level state of "1", outputs a corresponding one of the output values of the subtractor 115 to the second amplifier 121.

The second selection unit 119 outputs the reference value, for example, "0", to the second amplifier 121 in response to the comparison signal CS of the second logic state, for example, a high level state of "0". The output values of the subtractor 115 output from the second selection unit 119 or the reference value can be output directly to the reciprocal transformer 123.

The second amplifier 121 amplifies each of the first comparison results output from the comparison unit by a second weight m and outputs the amplified values to the reciprocal transformer 123. As the second amplifier 121 amplifies each of the first comparison results output from the comparison unit by the second weight m, the output levels of the first comparison results can be adjusted. The reciprocal transformer 123 performs reciprocal transformation on each of the output values of the second amplifier 121 and outputs each reciprocally transformed value as the channel state information $CSI_k$.

When the amount of the noise and interference of the sub-carrier is greater than the output value of the first amplifier 109, the $CSI_k$ has a small value so that the output level of the data symbol having a corresponding sub-carrier decreases. When the amount of the noise and interference of the sub-carrier is smaller than the output value of the first amplifier 109, the $CSI_k$ has a large value so that the output level of a corresponding data symbol increases.

The memory unit 125 stores the $CSI_k$ output from the reciprocal transformer 123. The memory unit 125 can be embodied by a non-volatile memory such as a RAM, an SRAM, a mask ROM, an EEPROM, an EPROM, etc.

The memory unit 125 can be embodied by a storage device such as a buffer, a register, a flip-flop, etc.

The $CSI_k$ can be calculated in Equation 3.

$$CSI_k = m \times \left( E[p \times (I_k + n_k)] - E\left[\sum S_k\right] \right)^{-1} \quad \text{[Equation 3]}$$

In Equation 3, p is a first weight and m is a second weight. For example, the channel state information $CSI_q$ of the $q^{th}$ sub-carrier, where q is a natural number, corresponds to a value produced by subtracting the second average power ($E[\Sigma S_k]$) of the $q^{th}$ sub-carriers of each of the transmitted frames from the first average power ($E[p \times (I_k+n_k)]$) obtained by amplifying the average power of the null symbol section 12-1 of each of the transmitted frames output from the OFDM transmitter by the first weight p, performing reciprocal transformation of a result of the subtraction, and multiplying a reciprocally transformed value by the second weight m.

The channel state information estimation unit detects the $CSI_k$ for each sub-carrier including the noise $n_k$ and interference signal $I_k$, multiplies the detected $CSI_k$ by a corresponding one of the data symbols of the service channel 16, and outputs a result of the multiplication. Thus, according to an embodiment of the present invention, a sub-carrier having a large noise $n_k$ and interference signal $I_k$ of the sub-carriers of the OFDM transmitted frame 10 has a small $CSI_k$ so that the amount of the data symbol including the sub-carrier can be reduced.

The decoding unit, having the differential decoder 126 and a second deinterleaver 127, differentially decodes corresponding symbols in the null symbol section 12-1 of each of the transmitted frames output from the OFDM transmitter and interleaves each differentially decoded symbol. The differential decoder 126 differentially decodes corresponding symbols forming the PRS section 12-2, the fast information channel 14, and the service channel 16 of the OFDM transmitted frame 10, and outputs the differentially decoded values.

The second deinterleaver 127 deinterleaves the output values of the differential decoder 126 and outputs the deinterleaved values to the multiplier 129. The multiplier 129 multiplies one of the output values of the decoding unit by a corresponding one of the output values of the channel state information estimation unit.

For example, the memory unit 125, in response to an address signal output from a controller (not shown), outputs corresponding channel state information of the $CSI_k$, for example, sub-carrier information about the first sub-carrier. The multiplier 129 multiplies the output value of the data symbol having the first sub-carrier of the transmitted frame 10 output from the decoding unit by the $CSI_k$ so that the level of the output data symbol can be adjusted.

According to an embodiment of the present invention, no additional compensation for the noise and interference signal is needed in the decoder 131 because the corresponding $CSI_k$ is multiplied before the data symbol of the service channel 16 is input to the decoder 131. The decoder 131 decodes each of the multiplied values output from the multiplier 129 and outputs a decoded signal.

According to an embodiment of the present invention, a noise reduction unit is provided. The noise reduction unit includes the average power calculation unit, the first deinterleaver 113, the first amplifier 109, a reference signal (e.g., set to the reference value), a noise estimation unit, and a reduction unit. The average power calculation unit receives OFDM frames and calculates a first average power of null symbol sections of the OFDM frames and a second average power of subcarriers of the null symbol sections. The first deinterleaver 113 deinterleaves the second average power to output a de-interleaved signal. The first amplifier 109 amplifies the first average power to output an amplified signal. The noise estimation unit generates noise information from the de-interleaved and amplified signals. The reduction unit reduces noise in the OFDM frames using the noise information. The noise reduction unit may include the memory unit 125 to store the noise information. The reduction unit may include the multiplier 129 to multiply the noise information by a data symbol of an OFDM frame to generate a multiplied symbol and the decoder 131 to decode the multiplied symbol.

According to an embodiment of the present invention, a noise estimation unit is provided. The noise estimation unit includes the first deinterleaver 113 outputting the de-interleaved signal of the signal that includes the second average power of the OFDM frames, the first amplifier 109 outputting the amplified signal of the signal that includes the first average power of the OFDM frames, and the reciprocal transformer 123. The noise estimation unit can generate a noise estimation based on a difference between the de-interleaved and amplified signals and a reciprocal transformation of the reference signal (e.g., set to the reference value), which can be used to reduce noise in the OFDM frames. The estimation unit may include the average power calculation unit to generate the average powers and the memory unit 125 to store the noise estimation. FIG. 3 is a flow chart that illustrates a method of estimating channel state information according to an exemplary embodiment of the present invention. Referring to FIGS. 1 through 3, the first average power calculator 107 of the average power calculation unit calculates and outputs the first average power of the null symbol section 12-1 of each of the transmitted frames output from the OFDM transmitter. The second average power calculator 111 calculates and outputs the second average power of sub-carriers that correspond to each null symbol section 12-1 (S10).

The first amplifier 109 multiplies the first average power by the first weight p and outputs a multiplied power (S20). The comparator 117 determines whether the second average power is greater than the multiplied power (S30).

When the second average power is greater than the multiplied power, the reciprocal transformer 123 performs a reciprocal transformation on a difference value between the multiplied power and the second average power and stores the reciprocally transformed value in the memory unit 125 as the $CSI_k$ (S42). When the second average power is smaller than the multiplied power, the reciprocal transformer 123 performs a reciprocal transformation on the reference value and stores the reciprocally transformed value in the memory unit 125 as the $CSI_k$ (S44).

The multiplier 129 multiplies the $CSI_k$ stored in the memory unit 125 by a corresponding one of the data symbols of the transmitted frames and outputs multiplied symbols (S50). The decoder 131 decodes the multiplied symbols (S60).

According to an embodiment of the present invention, channel state information is detected for each sub-carrier including the noise and interference signal and the channel state information is multiplied by a corresponding one of the data symbols and the multiplied value is output. Thus, the amount of data symbols having a sub-carrier in which the noise and interference signal is large can be reduced.

While this invention has been particularly shown and described with reference to exemplary embodiments thereof, it will be understood by those skilled in the art that various changes in form and details may be made therein without departing from the spirit and scope of the invention.

What is claimed is:

1. An orthogonal frequency division multiplexing (OFDM) receiver comprising:
   an average power calculation unit to calculate and output a first average power of a null symbol section of each transmitted frame output from an OFDM transmitter and to calculate and output second average powers of sub-carriers that correspond to each null symbol section; and
   an output unit to compare the first average power and the second average powers, to perform a reciprocal transformation on difference values of the first average power and each of the second average powers based on results of the comparisons, and to store and output reciprocally transformed values as channel state information.

2. The OFDM receiver of claim 1, wherein the average power calculation unit comprises:
   a first average power calculator to calculate and output the first average power of the null symbol section of each transmitted frame output from the OFDM transmitter; and
   a second average power calculator to calculate and output the second average powers of sub-carriers that correspond to each null symbol section.

3. The OFDM receiver of claim 1, further comprising:
   a first selection unit to select the null symbol section of each transmitted frame output from the OFDM transmitter; and
   a second selection unit to transmit an output signal of the first selection unit to the average power calculation unit in response to an identification information signal of the OFDM transmitter.

4. The OFDM receiver of claim 1, wherein the output unit comprises:
   a first amplifier to amplify the first average power by a first weight;
   a deinterleaver to deinterleave the second average powers;
   a comparison unit to compare output values of the deinterleaver with an output value of the first amplifier and to output first comparison results;
   a second amplifier to amplify the first comparison results output from the comparison unit by a second weight;
   a reciprocal transformer to perform a reciprocal transformation on output values of the second amplifier and to output each of the reciprocally transformed values as the channel state information; and
   a memory unit to store the channel state information output from the reciprocal transformer.

5. The OFDM receiver of claim 4, wherein the comparison unit comprises:
   a subtractor to subtract an output value of the first amplifier from each of the output values of the deinterleaver;
   a comparator to compare an output value of the subtractor with a reference value and to output a second comparison result; and
   a selection unit to output the output value of the subtractor when the comparison result of the comparator is greater than the reference value, and to output the reference value when the comparison result is less than the reference value,
   wherein the reciprocal transformer performs reciprocal transformation on the output values of the subtractor or the reference value and outputs reciprocally transformed values as the channel state information.

6. The OFDM receiver of claim 1, further comprising:
   a multiplier to multiply the channel state information stored in the outputting unit by a data symbol of the corresponding transmitted frames and to output multiplied symbols; and
   a decoder to decode each of the multiplied symbols output from the multiplier.

7. An orthogonal frequency division multiplexing (OFDM) receiver comprising:
   a decoding unit to differentially decode corresponding symbols in a symbol section of transmitted frames output from an OFDM transmitter to generate differentially decoded symbols and to deinterleave each of the differentially decoded symbols to output deinterleaved values;
   a channel state information estimation unit to compare a reference value with average powers of a null symbol section of each of the transmitted frames and to output a result of the comparison as channel state information; and
   a multiplier to multiply the deinterleaved values by a corresponding output value of the channel state information estimation unit.

8. The OFDM receiver of claim 7, wherein the channel state information estimation unit comprises:
   an average power calculation unit to calculate and output a first average power of a null symbol section of each of the transmitted frames and to calculate and output second average powers for sub-carriers that correspond to each null symbol section; and
   an output unit to compare the first average power with each of the second average powers, to perform a reciprocal transformation on difference values between the first average power and each of the second average powers based on results of the comparison, and to store and output reciprocally transformed values as the channel state information.

9. A noise reduction unit comprising:
   an average power calculation unit to receive a plurality of orthogonal frequency division multiplexing (OFDM) frames and to calculate a first average power of null symbol sections of the frames and a second average power of subcarriers of the null symbol sections;
   a de-interleaver to de-interleave the second average power to generate a de-interleaved signal;
   an amplifier to amplify the first average power to generate an amplified power signal;
   a noise estimation unit to generate noise information based on the de-interleaved signal and the amplified power signal; and
   a reduction unit to reduce noise in the OFDM frames using the noise information.

10. The noise reduction unit of claim 9, wherein the noise estimation unit comprises a reciprocal transformer to perform one of a reciprocal transformation on a difference between the de-interleaved signal and the amplified power signal and a reciprocal transformation of a reference signal.

11. The noise reduction unit of claim 10, wherein the reciprocal transformer performs the reciprocal transformation on the difference between the de-interleaved signal and the amplified power signal when the de-interleaved signal is greater than the amplified power signal.

12. The noise reduction unit of claim 10, wherein the reciprocal transformer performs the reciprocal transformation on the reference signal when the amplified power signal is greater than the de-interleaved signal.

13. The noise reduction unit of claim 9, further comprises a memory unit for storing the noise information.

14. The noise reduction unit of claim 9, wherein the reduction unit comprises:
   a multiplier to multiply the noise information by a data symbol of an OFDM frame to generate a multiplied symbol; and
   a decoder to decode the multiplied symbol.

15. The noise reduction unit of claim 9, wherein the average power calculation unit comprises:
   a first average power calculation unit to calculate the first average power; and
   a second average power calculation unit to calculate the second average power.

16. A noise estimation unit comprising:
   a de-interleaver to de-interleave a first signal that includes an average power of subcarriers of null symbol sections of a plurality of orthogonal frequency division multiplexing (OFDM) frames;
   an amplifier to amplify a second signal that includes an average power of null symbol sections of the frames to generate an amplified power signal; and
   a recipocal transformer to perform one of a reciprocal transformation on a difference between the de-interleaved signal and the amplified power signal and a reciprocal transformation of a reference signal to generate a noise estimation.

17. The noise estimation unit of claim 16, wherein the reciprocal transformer performs the reciprocal transformation on the difference between the de-interleaved signal and the amplified signal when the de-interleaved signal is greater than the amplified power signal.

18. The noise estimation unit of claim 17, wherein the reciprocal transformer performs the reciprocal transformation on the reference signal when the amplified signal is greater than the de-interleaved signal.

19. The noise estimation unit of claim 16, further comprises a memory unit for storing the noise estimation.

20. The noise estimation unit of claim 16, further comprising an average power calculation unit to calculate the average powers.

* * * * *